March 30, 1937.  O. C. W. HENZE ET AL  2,075,198
DELUSION APPARATUS
Filed Nov. 2, 1932  2 Sheets-Sheet 1
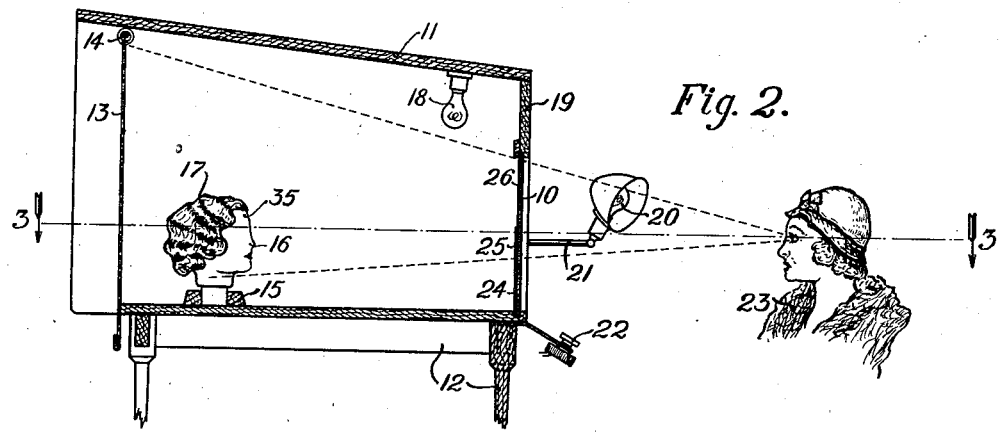
Fig. 2.
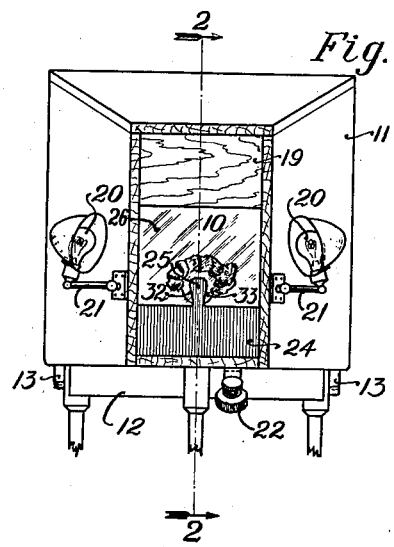
Fig. 1.
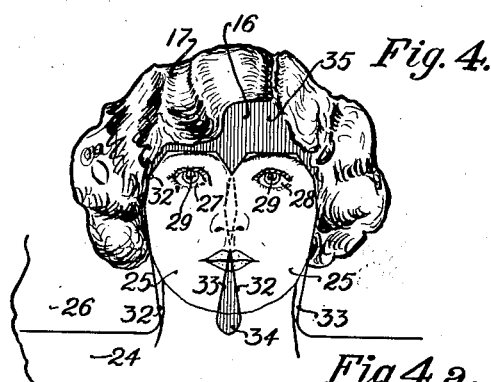
Fig. 4.
Fig 4a.
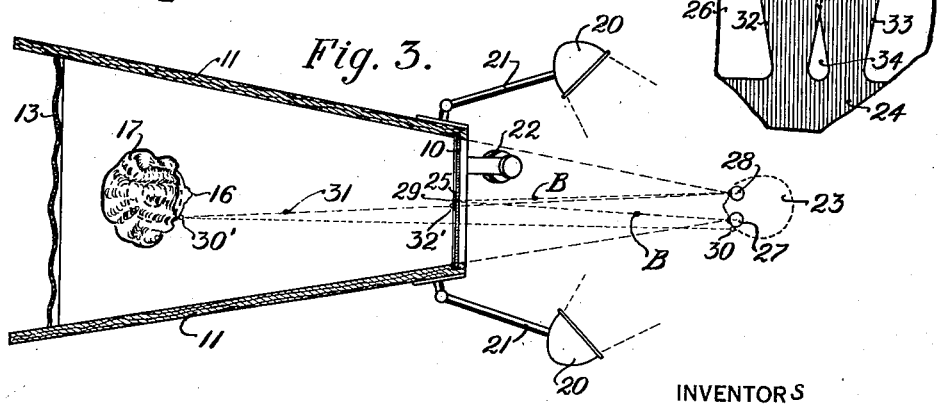
Fig. 3.
INVENTORS
OTTO C. W. HENZE.
RUTH V. TREMHIN.
BY
ATTORNEYS March 30, 1937.   O. C. W. HENZE ET AL   2,075,198
DELUSION APPARATUS
Filed Nov. 2, 1932   2 Sheets-Sheet 2
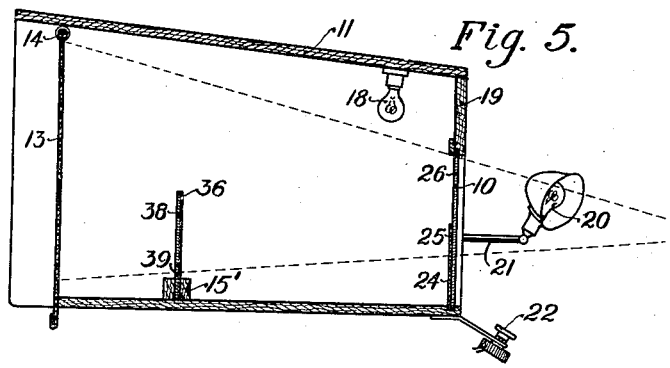
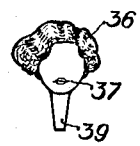
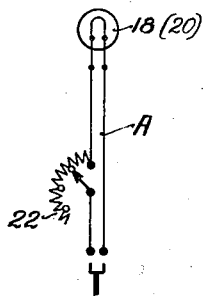
INVENTORS
OTTO C. W. HENZE.
BY RUTH V. TREMAIN.
ATTORNEYS Patented Mar. 30, 1937

2,075,198

UNITED STATES PATENT OFFICE 2,075,198

DELUSION APPARATUS

Otto C. W. Henze, Brooklyn, and Ruth V. Tremain, New York, N. Y.; said Tremain assignor to said Henze Application November 2, 1932, Serial No. 640,750

7 Claims. (Cl. 35—59)

This invention relates to a delusion apparatus.

The primary object of the invention resides in an apparatus embodying the principles of reflex by which a person may view his or her face features with a merging delusion, and more particularly in which displayed hair styles or the like appear to be the observer's own.

Another object of the invention is to provide a delusion apparatus by which only the observer's eyes may view the correct illusion whereby the desired privacy is obtained to exclude possible embarrassment to the observer.

A further object contemplates among other features, the provision of a delusion apparatus which is adapted for use in beauty parlors, department stores, studios, amusement resorts, and the like, to produce a delusion to the view of an observer.

A still further object of the invention is the provision of a delusion apparatus which is of a compact construction to take up little space when in use, and which will not detract from the appearance of a room in which it is installed.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a front elevational view of the delusion apparatus.

Figure 2 is a vertical longitudinal sectional view on the line 2—2 of Figure 1 and showing an observer positioned relative to the apparatus.

Figure 3 is a horizontal sectional view on the line 3—3 of Figure 2.

Figure 4 is a stereoscopic illusion picture as seen by an observer with both eyes.

Figure 4ª is a detail view showing the true stereoscopic effect obtained by an observer looking at the framing mirror with both eyes.

Figure 5 is a vertical longitudinal sectional view of a modified form.

Figure 6 is a detail front elevational view of the display picture shown in Figure 5.

Figure 7 is a diagrammatic view of the light control circuit.

Like reference characters refer to similar parts throughout the several forms of our invention.

Referring to the drawings by reference characters, the numeral 10 designates a combination mirror and transparent panel mounted in an opening in the front wall of a box or casing 11. The side walls of the box converge toward the front, while the top wall is forwardly inclined, making the rear end of the box larger than the front end. The bottom wall of the box is horizontally disposed and rests upon an elevated stand or table 12. The rear open end of the box is closed by a removable and adjustable drop curtain 13 suspended from a ring bar 14 extending transversely of the box adjacent the top thereof. It is through the rear open end of the box that access may be had to the interior thereof for a purpose to be hereinafter explained.

Mounted on the bottom of the box centrally thereof and adjacent the rear end, is a receptacle or socket member 15 which removably receives the neck of a wax figure head 16, which supports a removable wig 17 of a particular hair style. Any number of various styles and colored wigs may be interchangeably associated with the head for the purpose of changing the display. The head and wig constitute a fixed hair style representation which may be displayed in various other manners as will be seen by reference to the various modifications hereinafter described.

Suspended from an electric lamp socket mounted on the top of the box 11 is an electric lamp 18, which is concealed from view when looking at the front of the box, by a blind or panel 19 disposed directly above the combined mirror and transparent panel 10. The direct rays of the lamp 18 are shielded from the eyes of the observer by the panel 19 as best seen in Figure 2 of the drawings.

Mounted exteriorly at the front of the box 11 and disposed on opposite sides thereof are electric lamps 20 supported upon adjustable brackets 21 for illuminating the face of an observer during use of the device. Fixedly supported at the front of the box is a rheostat 22 which is in easy reach of an observing person shown at 23 and which is arranged in an electric circuit A with the electric lamp 18 and any suitable source of electrical energy. The rheostat is provided for regulation or control of light within the box to obtain a difference or balance in light between the inside thereof and the exterior light produced by the lamp 20. If desired, the intensity of the light produced by the lamp 18 may be constant, while the lamp 20 may be controlled by a rheostat arranged in circuit therewith.

The combined mirror and transparent panel 10 includes a lower reflecting mirror field or portion 24 from which a single substantially inverted pear shaped mirror extension 25 extends into a clear transparent field 26. Although a single mirror extension 25 exists, it appears double and overlapping to the eyes of an observer as illustrated in Figure 4ª of the drawings. The mirror extension 25 is disposed centrally of the width of the panel 10 and is of a shape to frame and reflect the facial features of an observer, the lower mirror field 24 reflecting the shoulders or upper portion of the body of the observer 23. The mirror extension 25 has been referred to above as substantially inverted pear-shaped, or may even be described as of a shape similar to that of an undercut gear tooth. More specifically, the mirror extension 25 includes an enlarged upper head portion 50 and a downwardly tapering lower portion 51. The sides 52 of the lower portion 51 converge downwardly and join with the top horizontal edge of the mirror field 24. The top ends of the downwardly converging sides 52 join with upwardly converging sides 53 which define the sides of the head 50 and meet with the ends of the flat top edge 54 thereof. By such shape of mirror, the hair of the observer is masked out of the reflected image of the observer for the delusion hereinafter explained.

For the sake of illustration, the left and right eye balls of the observer 23 are designated at 27 and 28 respectively, and in Figure 3 of the drawings, the same are focused for looking at themselves in the mirror 10. In Figure 3, the dotted lines B converging from the eye balls represent the direct binocular vision axis of both eyes of the observer, intersecting each other in this action at the point 29 of the mirror extension 25, or in other words, the right eye 28 is in reality looking by direct mirror reflection into the left eye 27.

For illustration purposes, a point 30 on the left temple of the observer will coincide with the virtual imaginary point 30' on the display figure 16 according to the principles of the mirror reflex laws, but the actual position 32' on the mirror extension 25 will be checked by the vision line 31 of the right eye 28. In other words, the right eye 28 is determining the left edge 32 of the mirror extension, while the left eye 27 is determining the right edge 33 of the said extension. As the mirror extension 25 is to reflect very closely the face features of the observer while seeing with both eyes and the natural spacing of the human eyes must be accepted as is, a lapping of the mirror extension 25 will appear to the observer as shown in Figure 4ª of the drawings, which by reason of the shape of the extension will produce a drop shaped opening 34 as seen in Figure 4, while the missing reflex features will be substituted by partial protruding ones from the display figure 16.

Inasmuch as both the observer and the display inside of the box 11 must be separately illuminated in order to be visible and furthermore natural human complexion of the observers may vary, an illumination control of either the lamp 18 or lamps 20 is necessary, and which is obtained by the manipulation of the rheostat 22.

In practice, the observer 23 takes a position in front of the box 11 and views his or her face features up to the eyebrows, as the same are reflected by the mirror 24 and its extension 25. Any part of the observer beyond the eyebrows and sides of the face cannot be reflected due to the clear transparent field 26 above the mirror surface 24 and about the mirror extension 25. The headdress or wig 17 of the display figure 16 is visible to the observer and which is framed with the reflected facial features. The mirror extension 25 masks out by reflective action the features of the display figure excepting the hair which is merged with the reflected image of the face of the observer. Assuming that the lamp 18 is illuminated to produce only a dim light while the observer has a relatively light complexion, then the specific illumination of the reflected observer's face is brighter than the display figure 16 within the box 11, in which case, the illusion will be seen exactly as depicted in Figure 4 of the drawings. The observer should then adjust the rheostat 22 which in turn will increase the specific illumination of the display figure 16 to a point equal to that of the face reflex. In other words, the observer will adjust the rheostat until the V above the nose and drop shaped gap 34 disappear, at which time the observer cannot tell whether the visible front 35 of the display figure 16 belongs to the face of the observer or to the display as seen for the illusion is perfect.

In the preceding form of our invention, we have disclosed wax figures and wigs as the display figure, but such are very costly, are hard to handle and take up a large amount of room for storage. We have found that good results can be obtained by the employment of hair style prints in natural colors and size of the form illustrated at 36 in Figure 6 of the drawings. This type of display figure has been shown in operative positions in Figure 5 of the drawings, and is of a shape similar to that of a human head and neck. On the front, only a trace of the mouth features need be printed as shown at 37 to fill out the aforementioned illusion gap at 35. The pictures are mounted on a flat rigid body 38 and the neck portion 39 is of a size to fit into the socket or receptacle 15' mounted on the bottom of the box or casing 11.

From the foregoing description, it will be seen that we have provided an apparatus whereby a person may see with his or her eyes exactly how she or he would look with certain styles of hair dress, such device will be found exceptionally useful in beauty parlors where a customer could be satisfied in advance as to his or her appearance after the hair has been dressed in a predetermined style.

While we have shown and described what we deem to be the most desirable embodiments of our invention, we wish it to be understood that various changes as come within the scope of the appended claims may be resorted to if desired.

Having thus described the invention, what we claim as new and desire to secure by Letters Patent of the United States, is:—

1. In an apparatus of the class described, a rectangular shaped mirror, a mirror extension rising from said mirror and of an outline substantially corresponding to that of a human face and of an area to define the facial features exclusive of the hair of an observer when viewed from a predetermined distance by both of the observer's eyes simultaneously, and a fixed coiffure representation behind said mirror, a portion of which is obscured by said mirror extension when looking thereinto while the remaining portions of said coiffure representation surrounds the reflected image of the observer's face to produce a delusion.

2. In an apparatus of the class described, a mirror having an upwardly extending mirror extension of an outline substantially corresponding to that of a human face and of an area to define the facial features exclusive of the hair of an observer when viewed from a predetermined distance simultaneously by the observer's both eyes, and a fixed coiffure representation behind said mirror, a portion of the coiffure representation being obscured by the mirror extension when looking thereinto while the remaining portions of said coiffure representation surround the reflected image of the observer's face to produce a delusion, separate controllable illuminating means for said coiffure representation and for the observer, and means for regulating said illuminating means to obtain either an equal or different intensity of light therebetween.

3. In an apparatus of the class described, a housing, a mirror mounted in the front of said housing including a mirror extension of an outline substantially corresponding to that of a human face and of an area to define the facial features exclusive of the hair of an observer when viewed from a predetermined distance by both of the observer's eyes simultaneously, and a head display having a coiffure mounted within said housing in spaced relation to said mirror, the mirror extension masking out that portion of said head display excepting said coiffure thereof to the eyes of an observer looking into said mirror extension, while the coiffure surrounds and merges with the reflected facial image of the observer.

4. In an apparatus of the class described, a housing, a mirror mounted in the front of said housing including a mirror extension of an outline substantially corresponding to that of a human face and of an area to define the facial features exclusive of the hair of an observer when viewed from a predetermined distance by both of the observer's eyes simultaneously, and a head display having a coiffure mounted within said housing in spaced relation to said reflex mirror, the mirror extension masking out that portion of said head display excepting said coiffure thereof to the eyes of an observer looking into said mirror, while the coiffure surrounds and merges with the reflected facial image of the observer, illuminating means, and control means for causing the light intensity of the display to coincide and balance with the light intensity of the facial image.

5. In an apparatus of the class described, a housing having an opening in the front wall thereof, a mirror mounted in said opening and partially covering the same, said mirror provided with a central upstanding mirror extension of an outline substantially corresponding to that of a human face and of an area to define the facial features exclusive of the hair of an observer when viewed from a predetermined distance by both of the observer's eyes simultaneously, and a head display having a coiffure representation mounted within said housing in spaced optical relation to said mirror extension, that portion of said head display excepting said coiffure being masked out by the mirror extension to the eyes of an observer while the visible parts thereof are adapted to surround and merge with the reflected facial image of the observer.

6. In an apparatus of the class described, a fixed coiffure representation, and mirror means forward of said fixed coiffure representation having its silvered surface at its rear, said mirror means including a body portion and an extension projecting from one edge of the body portion of an outline substantially corresponding to that of a human face and of an area to reflect an image of the face only of an observer when looking into the mirror toward the representation, whereby the facial image of the observer reflected on said extension and said coiffure representation merge.

7. In a apparatus of the class described, a mirror of a width smaller than that of a human figure including a body portion and extension projecting from the top edge of said body portion of an outline substantially conforming to that of a human face and of an area to reflect an image of the face only of an observer when looking into said mirror when the observer is positioned a predetermined distance foward of said mirror, and a coiffure representation mounted at a fixed predetermined distance rearward of said mirror in alinement with the mirror extension whereby the facial image of the observer is reflected on said extension portion in merging relation with the coiffure representation.

OTTO C. W. HENZE.
RUTH V. TREMAIN.